United States Patent [19]

McGahee

[11] Patent Number: 5,070,640
[45] Date of Patent: Dec. 10, 1991

[54] FISHING LURE

[75] Inventor: Welbourne D. McGahee, Melbourne, Fla.

[73] Assignee: Loop-A-Line, Inc., Melbourne, Fla.

[21] Appl. No.: 418,230

[22] Filed: Oct. 6, 1989

[51] Int. Cl.[5] .............................................. A01K 85/00
[52] U.S. Cl. .................................. 43/42.52; 43/42.53; 43/42.4
[58] Field of Search .................... 43/42.5, 42.53, 42.37, 43/42.52, 42.4, 42.42, 42.38

[56] References Cited

U.S. PATENT DOCUMENTS

| | | | |
|---|---|---|---|
| 1,314,052 | 8/1919 | Dubrow | 43/42.52 |
| 1,752,088 | 3/1930 | Huntington | 43/42.52 |
| 1,754,073 | 4/1930 | Yates | 43/42.52 |
| 1,774,976 | 9/1930 | Huntington | 43/42.52 |
| 2,163,378 | 6/1959 | Horvath | 43/42.52 |
| 2,164,415 | 7/1939 | Mallett | 43/42.52 |
| 2,167,163 | 7/1939 | Toepper . | |
| 2,169,764 | 12/1952 | Lange . | |
| 2,255,222 | 9/1941 | Leasch | 43/42.52 |
| 2,419,753 | 4/1947 | Adain | 43/42.52 |
| 2,481,710 | 9/1949 | Arndt | 43/42.52 |
| 2,509,179 | 5/1950 | Warnock | 43/42.42 |
| 2,519,338 | 8/1950 | Arnold . | |
| 2,567,813 | 9/1951 | Hyland . | |
| 2,895,252 | 7/1959 | Tibbetts . | |
| 2,989,816 | 6/1961 | Ebert . | |
| 3,869,821 | 3/1975 | McGahee . | |
| 4,924,618 | 5/1990 | McGahee | 43/42.09 |

Primary Examiner—Kurt Rowan
Assistant Examiner—James Miner
Attorney, Agent, or Firm—Harold Gell

[57] ABSTRACT

An artificial spoon type fishing lure including openings through the spoon body which are positioned and dimensioned to permit cooperation between the shape of the spoon and the structure of associated hooks and weedguards whereby the hooks and weedguards may be attached and secured to the spoon by the spring tension inherent in the parts.

35 Claims, 5 Drawing Sheets

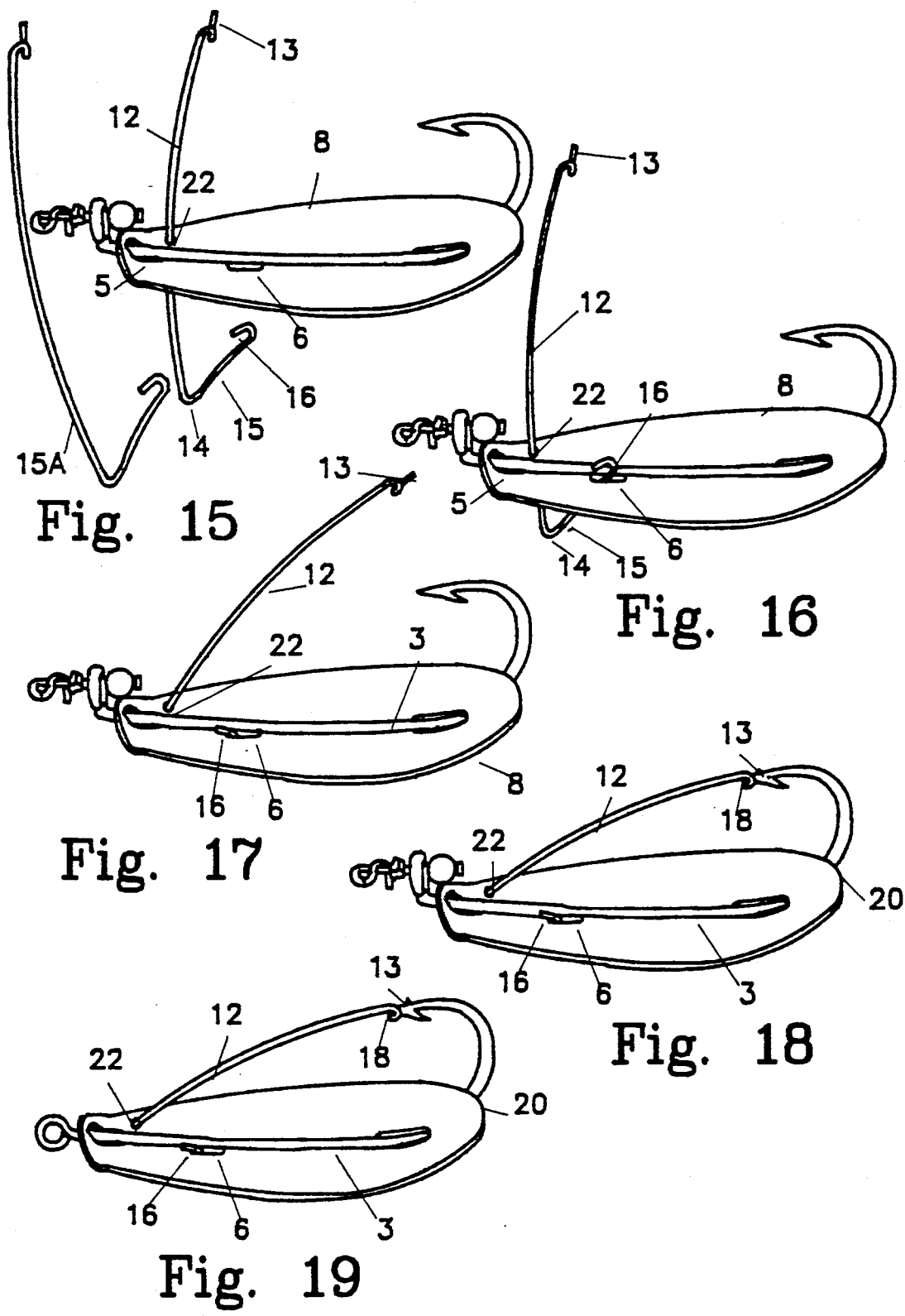

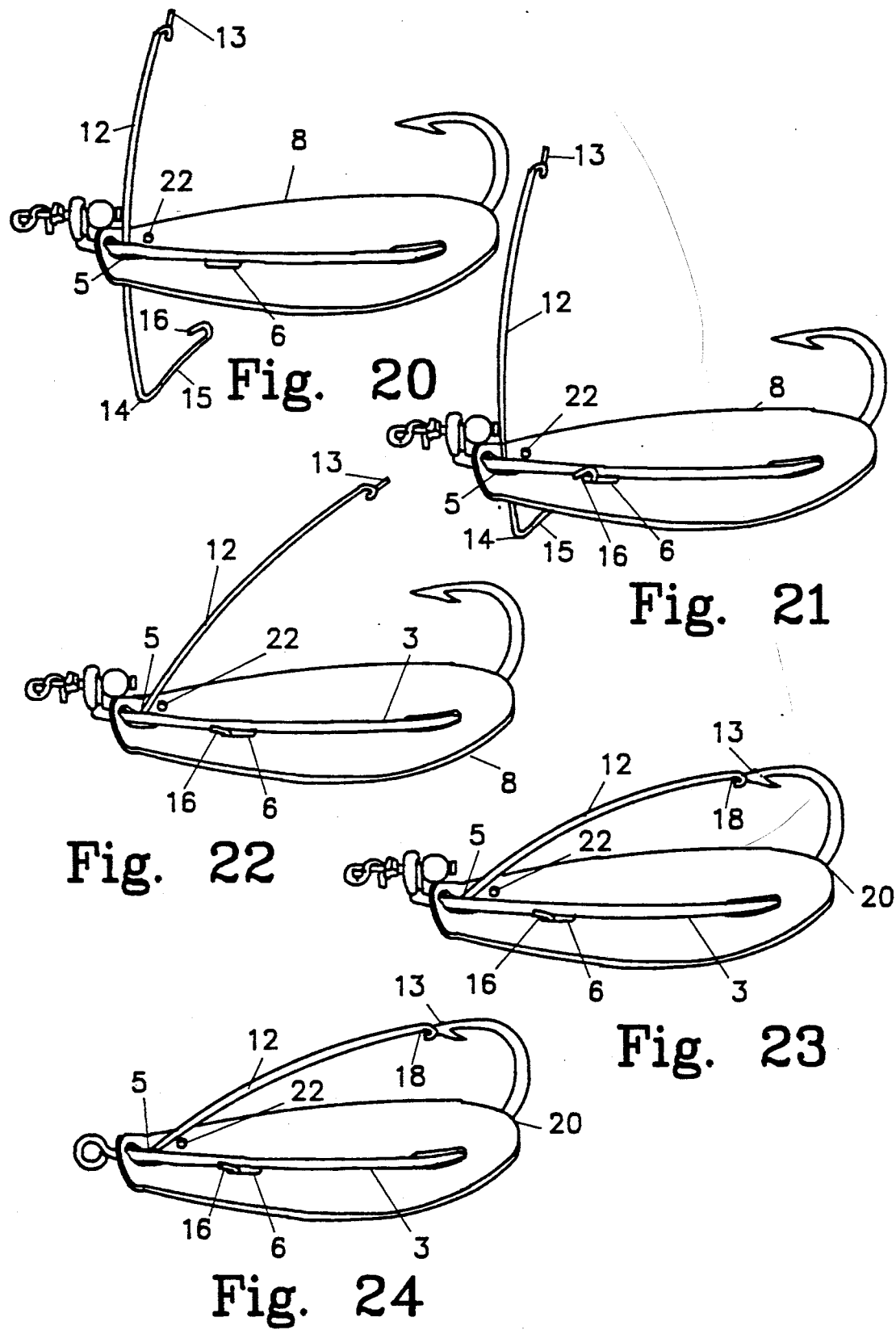

FISHING LURE

FIELD OF THE INVENTION

The present invention relates to the class of fishing lures known as spoons.

BACKGROUND OF THE INVENTION

Artificial fishing lures shaped like spoons are well known. Most have a hook and weedguard attached by soldering, welding or by a screw means such as illustrated in U.S. Pat. No. 3,869,821. They are commonly called spoons because of their body shape. They are attached to fishing lines and pulled through the water where they assume a horizontal position. Spoons are usually metal with a high polished or bright painted scheme to attract fish. The spoon shape is designed to ensure that the lure will not rise to the top of the water at high trolling speeds.

A typical spoon is disclosed in C. F. Pflueger U.S. Pat. No. 1,992,766 issued on Feb. 26, 1935 for "Trolling Spoon". It incorporates a removable hook and weedguard secured screws. The screws are a labor intensive means to assemble the device, adversely affect the action of the lure when trolled, and work loose and fail.

H. C. Toepper U.S. Pat. No. 2,167,163 issued on July 25, 1939 illustrates a spoon assembly which attempts to solve the problems created by screws. A lug is pressed snugly against the loop of the eye retaining both weedguard and hook permanently to the spoon body. The screws are eliminated but the result is a non-removable hook and weedguard.

R. C. Arnold in U.S. Pat. No. 2,519,338 issued Aug. 22, 1950 illustrates the continued reliance on screws for securing removable weedguards and hooks.

C. F. Mellin illustrates the persistence of screws in U.S. Pat. No. 2,619,764 issued Dec. 2, 1952. He teaches a removable hook and weedguard both retained by a screw.

A still further example of the persistence of the use of screws to secure hooks and weedguards is issued to R. O. Tibbetts in U.S. Pat. No. 2,895,252 issued July 21, 1959.

Thus the industry has accepted the inevitable use of screws to secure hooks and weedguards to spoons but a few are valiantly trying to improve the art and avoid the penalties extracted by the screw.

D. F. Hyland in U.S. Pat. No. 2,567,813 issued Sept. 11, 1951 teaches a removable hook which is retained by a snap but the weedguard is part of the stamped spoon body and not removable.

E. A. Ebert in U.S. Pat. No. 2,989,816 issued June 27, 1961 avoids the screw but the hook and weedguard are not removable.

The foregoing represents the various attempts to improve spoon type artificial baits. They all have one thing in common—they are costly and thus the spoons are not economically feasible to manufacture.

Soldering or welding have been used as an alternative to screws and crimping but the spoon, hook and weedguard have to be jigged to hold the parts during joining. When the parts are soldered or welded, they are annealed by the heat required to perfect the bonding. Because of the annealing which takes the temper out of the metal, the entire assembled spoon must be heat-treated to make the weedguard harden enough to be springy again.

The soldering or welding and heat-treating cause the assembly to be unsightly and it must be cleaned and polished to receive any plating that may be desired.

Polishing the assembled spoon is a very dangerous procedure due to the sharp pointed hook and weedguard. Because the hook and weedguard are attached, each spoon must be polished one at a time.

A further disadvantage resulting from soldering or welding is the effects of the required pickling acids on equipment, buildings and personnel.

With the present invention, both the manufacturer and end user gains. Some of the gains to the manufacturer have been eluded to. Exemplary gains to the end user follow:

When a soldered or crimped spoon breaks either the hook or the weedguard is useless and the metal spoon is thrown away. This wastefulness can be eliminated if the parts are replaceable. Screws provide this advantage but require a repair facility that is not normally available at the fishing site.

In summary, present day spoons are lacking because hooks, if removable, cannot be removed without tools, hooks and/or weedguards cannot be rapidly changed when a different size is desired, and weedguards cannot be added or removed as required.

OBJECTIVES OF THE INVENTION

Accordingly, it is the primary objective of the present invention to provide an artificial fishing lure of the spoon type which completely eliminates all the manufacturing steps now used in jigging and soldering spoons, hooks and weedguards into an assembly.

Another objective is the elimination of the cost to the manufacturer for bonding metals such as silver base solder required in order to be able to plate the spoon body at the end of the manufacturing process.

Another objective is the elimination of costly clean-up from plating of the final product.

Another objective is the elimination of the cost of the gases used in soldering the hook and the weedguard to the spoon body.

Another objective is eliminating having to plate the spoon bodies due.

Another objective is to produce a spoon that can be tumble polished.

Another objective is to make it possible for the manufacturer to add the detachable hook as a last step before he packages the finished product.

Another objective is to minimize the number of persons exposed to attached hooks, thereby decreasing the manufacturer's insurance cost and reducing the dangers to the workers.

Another objective is to completely eliminate the need to polish spoons with hooks attached.

A still further objective is to eliminate the need to heat treat the metals that were previously annealed during the soldering process.

Yet another objective is to make it possible for the end user to replace either the hook or the weedguard, or both.

A still further objective is to make it possible for the fisherperson to change the diameter of the wire used in the weedguard in order to make the weedguard easier for the fish to become hooked, which objective will also make it possible for the fisherperson to change to a weedguard of large diameter wire to make the weedguard stiffer.

A still further objective is to provide a spoon on which wrong sized or broken hook may be replaced without tools.

Another objective is to make it possible for the manufacturer to polish large quantities of spoon bodies at the same time rather than one at a time as is now done due to the permanently attached hook on the spoon body.

A still further objective of the invention is to produce a spoon type artificial lure with removable, replaceable hooks and weedguards.

Another objective is to completely eliminate the soldering, welding, screwing or crimping phases of manufacturing and makes it possible to polish the spoon body with the hook and weedguard unattached.

A further objective is a spoon on which the weedguards can be changed in the field without tools and in seconds so one can use different diameter weedguards to make the weedguard harder to unseat or easier to unseat.

Another objective of the present invention is to make it possible to change the hook size as well as replace broken hooks on spoons in the field without tools.

Another objective of this invention is to provide great savings in the time to manufacturer and the cost to manufacturer by eliminating the manufacturing steps of jigging to hold the parts to be assembled. Soldering, crimping or screwing steps, and the hardening steps of the annealed parts while providing the ability to polish in large quantities greatly reduces the overall cost.

Another objective is to make a fishing spoon by a means which greatly reduces the cost to manufacturers and allows the fisherperson to rapidly replace broken hooks and/or weedguards without tools. Spoons in use to date have their hooks soldered as well as the weedguard soldered to them.

The foregoing and other objectives of the invention will become apparent in light of the specification and claims presented herein.

SUMMARY OF THE INVENTION

The present invention is an artificial spoon type fishing lure including openings through the spoon body which are positioned and dimensioned to permit cooperation between the shape of the spoon and the structure of associated hooks and weedguards whereby the hooks and weedguards may be attached and secured to the spoon by the spring tension inherent in the parts.

DESCRIPTION OF THE DRAWINGS

FIG. 15 illustrates the first step of attaching removable weedguard to the spoon's body using an aperture common with the hook. Note that the weedguard has entered the front aperture in the spoons' body.

FIG. 16 illustrates the removable, replaceable weedguard as it is positioned in the second step of attaching it to the spoon's body using an aperture common with the hook and an alternate weedguard 15A having different spring properties. Note that one free end of the weedguard is in one aperture of the spoon's body and the long straight part of the weedguard is in another aperture in the spoon's body.

FIG. 17 illustrates the weedguard as it is positioned in the third step of being attached to the spoon's body using an aperture common with the hook. The weedguard is secured onto the spoon's body.

FIG. 18 illustrates the weedguard's free end positioned under the hook's point. The spoon is ready for the fishing line to be attached.

FIG. 19 is same configuration as FIG. 18 except the hook is the type illustrated in FIG. 6.

FIG. 20 illustrates the first step of attaching removable weedguard to the spoon's body using an auxiliary aperture. Note that the weedguard has entered the front aperture in the spoons' body.

FIG. 21 illustrates the removable, replaceable weedguard as it is positioned in the second step of attaching it to the spoon's body using an auxiliary aperture. Note that one free end of the weedguard is in one aperture of the spoon's body and the long straight part of the weedguard is in another aperture in the spoon's body.

FIG. 22 illustrates the weedguard as it is positioned in the third step of being attached to the spoon's body using an auxiliary aperture. The weedguard is secured onto the spoon's body.

FIG. 23 illustrates the weedguard's free end positioned under the hook's point. The spoon is ready for the fishing line to be attached.

FIG. 24 is same configuration as FIG. 23 except the hook is the type illustrated in FIG. 6

DESCRIPTION OF THE INVENTION

Figure 1:
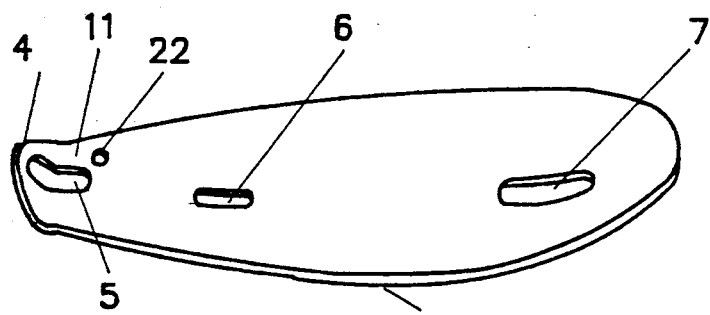
FIG. 1 a ¾ view of the concave surface of the spoon body.
Figure 2:
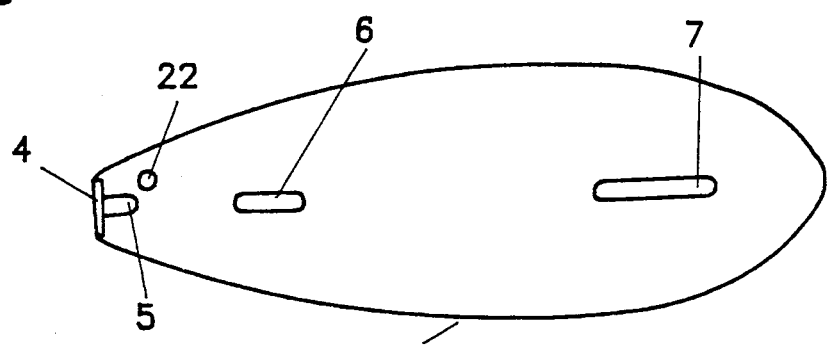
FIG. 2 is a top view of spoon body looking at its inside concave surface.
Figure 3:
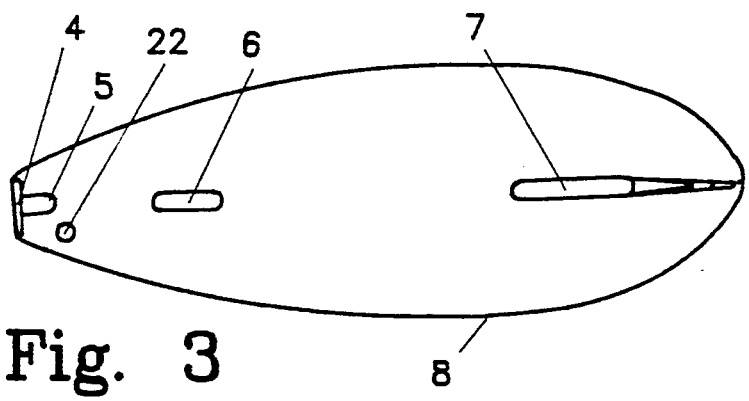
FIG. 3 is a top view of the outside convex surface of spoon body.
Figure 4:
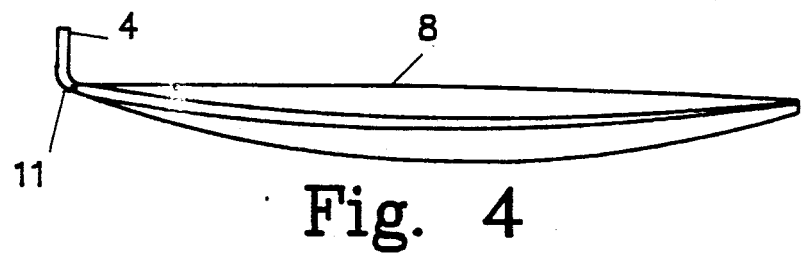
FIG. 4 is a side view of the spoon body.

FIG. 1 illustrates a top ¾ view of the spoon's concave inner surface. A portion 4 of the spoon is bent up 90 degrees to the remainder of the spoon's body to form a tab. A front aperture 5 is provided in the tab 4 and may continue through the bend 11 and into the spoon body as illustrated. An aperture 6 is provided in the middle of the spoon body 8 and an aperture 7 is located at the large end of the spoon. An optional small aperture 22 is offset from aperture's 5, 6, and 7. The foregoing features and the general overall shape of the spoon may be more clearly understood by comparing the top views of the concaved side of the spoon in FIGS. 1 and 2 with the convexed bottom view of FIG. 3 and side view of FIG. 4. The groove 10 of FIG. 3 is stamped or ground into the spoon to lock the hook in position.

Figure 5:
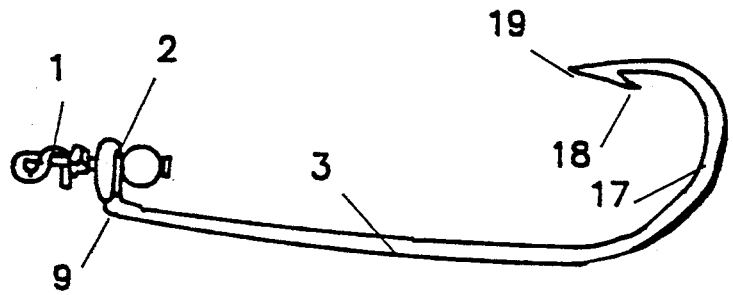
FIG. 5 is a side view of a removable, replaceable fish hook of the type having its eye bent up 90 degrees to the hook's shank. A patented connector, U.S. Pat. No. 3,869,821 is fitted through the eye.
Figure 6:
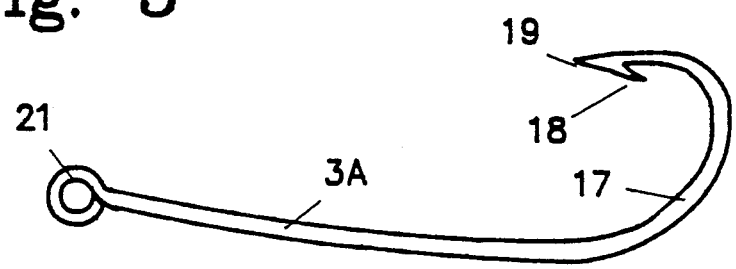
FIG. 6 is a standard hook with the eye laying in the same plane as curve of the hook.

FIG. 5 illustrates a fishing lure attachment or component better known as a hook that may be used in the present invention. This hook incorporates a patented coupling device, (U.S. Pat. No. 3,869,821 issued Mar. 11, 1975) in its eye 2 which is bent up at 90 degrees to the hook's shank 3. FIG. 6 illustrates an alternate hook that may be used with this invention. It includes a point 19 and a barb 18 connected to the main shank 3A by a curved section 17. This is a standard straight shank hook with an eye in the same plane as the hook's curved section. The hooks illustrated are exemplary. The invention may be used with all hook styles, including multi-pointed hooks.

Figure 7:
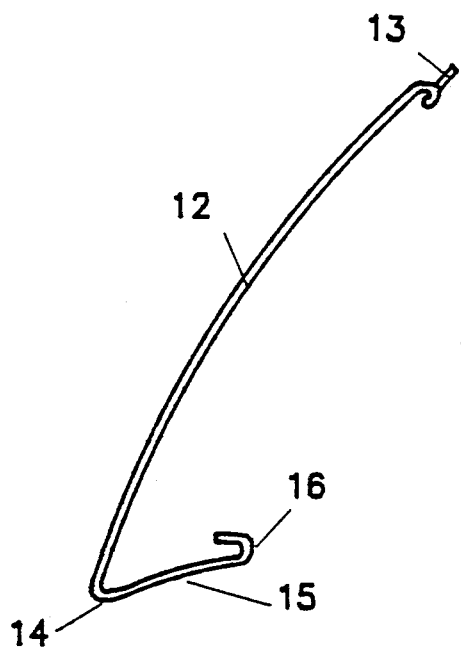
FIG. 7 is a detachable, replaceable weedguard.
Figure 8:
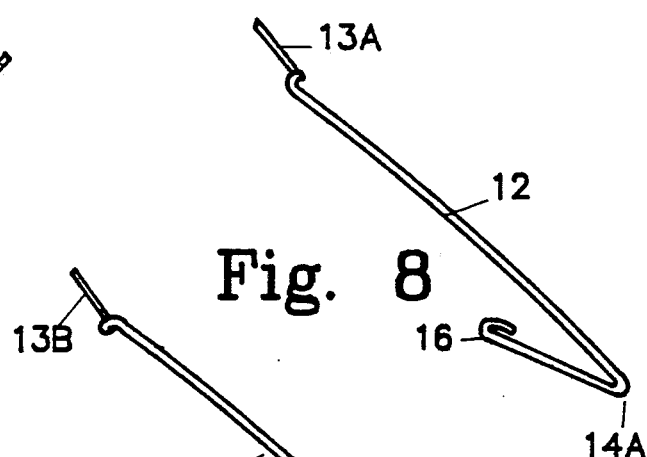
FIG. 8 is a top view of a left hand version of the weedguard.
Figure 9:
FIG. 9 is a top view of a right hand version of the weedguard.

FIGS. 7, 8 and 9 illustrate another fishing lure attachment or component, a removable, replaceable, spring wire weedguard 12. It includes an end portion 13 which is received by a hook barb 18. Two opposing bends 14 and 16 are separated by the straight section 15. The bends 14 and 16 secure the weedguard appliance into apertures 5 and 6 of spoon's body 8 so that the spring section 12 can protect the hook opening.

FIG. 8 illustrates a top view of a weedguard appliance with the weedguard tip 13A bent to the left side. In FIG. 9, the tip 13B is bent to the right side. Thus creating right and left handed weedguards.

A preferred method of producing the spoon is to punch spoon blanks, including holes or apertures 5, 6, 7 and 22 from sheets of metal, die form the convex shape, bent tab 4 and recess 10, polish or otherwise provide a suitable surface finish and snap on the components such as hooks and weedguards as illustrated in FIGS. 10 through 24.

Figure 10:
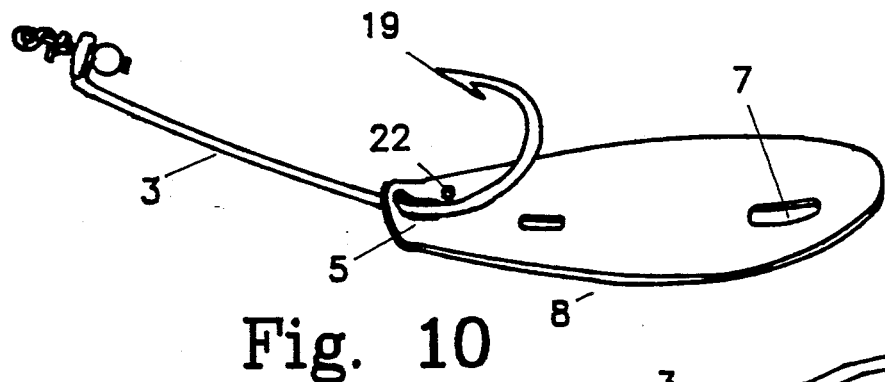
FIG. 10 illustrates the first step in attaching the removable hook to the spoon body.
Figure 11:
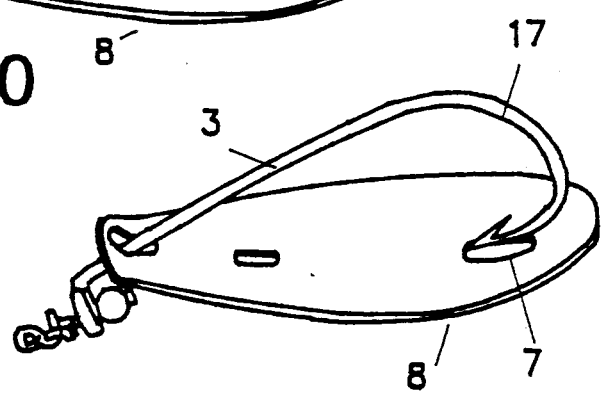
FIG. 11 illustrates the position of the hook at the second step in attaching it to the spoon body. Note the hook's point 19 has entered aperture 7 in the spoon's body.

To add a hook to the spoon body, the point 19 of the hook is passed through aperture 5 in the spoon's body 8 as illustrated in FIG. 10. The hook shank 3 is slid through aperture 5, rotated 180 degrees and the hook point 19 is placed in aperture 7 as shown in FIG. 11.

Figure 12:
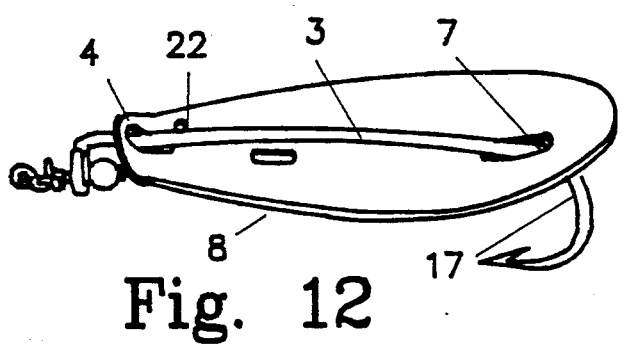
FIG. 12 illustrates the detachable, removable hook as it is positioned in the third step of attaching it to the spoon's body.

The curved portion 17 of the hook is pushed down and moved towards the small end of spoon to force the hook point 19 and curved portion 17 through the aperture as shown in FIG. 12.

Figure 13:
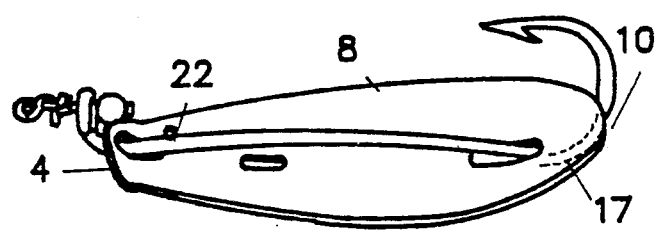
FIG. 13 illustrates the hook positioned at the final step of attaching it to the spoon's body. The hook has been rotated 180 degrees from its position shown in FIG. 12.

The hook is rotated 180 degrees to the position illustrated in FIG. 13. When the 180 degree rotation of hook takes place and the spoon is configured as in FIG. 13, the shank area 3 of the hook is on the inside of the concave portion of the lure body 8. In this position, the entire hook's shank is under stress and the shank can be seen to be curved upwards from the concave portion of the spoon if the spring of the hook is less than the spoon body. This curve, or arching, acts as the tension means to retain the hook and spoon in the position seen in FIG. 13 where it is locked in position by the groove 10 illustrated in FIG. 3 and into which the portion of the shank 3 transitioning into the curved portion 17 snaps when the hook is rotated to the position shown in FIGS. 13 and 14.

Figure 14:
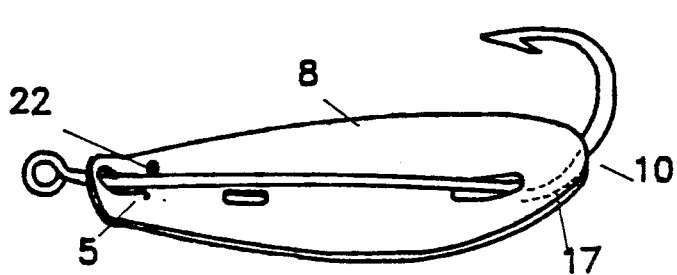
FIG. 14 illustrates a hook of the type illustrated in FIG. 6, positioned same as the hook in FIG. 13.

FIG. 14 shows a hook with a standard eye 21 in sam plane as curve in hook. Regardless of hook style, the basic procedures illustrated by FIGS. 10 through 13 are used to attach the hook, however when the hook is rotated from the FIG. 12 position to the FIG. 14 position, the hook eye 21 functions as a cam surface against the edges of aperture 5 which forces the spoon tab 4 toward aperture 7 to create a spring bias which snaps the hook into position because of the elliptical shape of aperture 5. Once snapped in position, the differential spring tension between the hook and spoon body hold the hook securely in position as illustrated in FIG. 14 and the groove 10 may be eliminated.

One method of attaching a weedguard is illustrated by FIGS. 15 through 19. In FIG. 15, the hook engaging end 13 is passed through aperture 5. Next, the spring section 12 is slid through aperture 5 and maneuvered so that the bent end 16 passes through aperture 6 as illustrated in FIG. 16. The weedguard end 13 is pulled up and toward the hook end of the spoon until the bend 14 snaps into place as shown in FIG. 17. It is held in this position by the relative spring force exerted between the spoon body and the section of the weedguard including bends 14 and 16 and the wire therebetween.

The spring section 12 of the weedguard is bent and manipulated so that the hooked end 13 engages the barb 18 and wraps about the hook point as illustrated in FIGS. 18 and 19. The assembled spoon is now ready to be secured to the fishing line and fished through weeds.

The weedguard and hook may be removed from the spoon body 8 by reversing the steps shown in FIGS. 10 through 24. The Weedguard 12 can be removed and replaced while the hook is attached to the spoon body to make it possible for the fisherperson to change the diameter of the wire used in the weedguard in order to make the weedguard easier for the fish to become hooked or make it possible for the fisherperson to change to a weedguard of larger diameter wire to make the weedguard stiffer. This principle may be extended to the fish hooks so that they may also be exchanged for hooks having different wire diameters or other properties.

FIGS. 20 through 24 illustrate attaching a weedguard to a spoon using an auxiliary aperture 22 instead of aperture 5. Aperture 22 is offset from apertures 5, 6, 7 in the spoon's body 8. This offset keeps the weedguard from coming in contact with the hooks shank 3 as it does in FIGS. 15 through 19. By keeping the weedguard out of contact with the hook's shank 3, the weedguard is allowed free movement in all directions as compared to the restricted or laterally biased movement which occurs when the weedguard is allowed to come in contact with the hook's shank 3. With restricted or laterally biased movement of the weedguard, there is a tendency for the weedguard tip 13 to become locked under the hook's point. This is undesirable, therefore the preferred embodiment is shown in FIGS. 20 through 24 using offset aperture 22 to allow unbiased up and down movement of the weedguard.

The procedures for using aperture 22 to install a weedguard begin with FIG. 20 where the hook engaging end 13 is passed through aperture 22. Next the spring section 12 is slid through aperture 22 and maneuvered so that the bent end 16 passes through aperture 6 as illustrated in FIG. 21. The weedguard end is pulled up and toward the hook point end of the spoon until the bend 14 snaps into place as shown in FIG. 22. The spring section 12 of the weedguard is bent and manipulated so that the hook end 13 engages the barb 18 and wraps about the hook point as illustrated in FIGS. 23 and 24

Although the preferred embodiments of this invention have been illustrated and described, variations and modifications may be apparent to those skilled in the art. Therefore, I do not wish to be limited thereto and ask that the scope and breadth of this invention be determined from the claims which follow rather than the above description.

What I claim is:

1. A fishing lure, comprising:
   a body;
   a plurality of apertures in said body dimensioned to permit the passage therethrough of fishing lure attachments and positioned to result in a relative spring bias between said body and one of said fishing lure attachments which passes through two of said apertures when said attachment is rotated about the longitudinal axis of the portion of said fishing lure attachment which extends through and resides in said two apertures whereby said axis passes through said two apertures; and
   said relative spring bias holds said fishing lure attachments in a predetermined position on said body.

2. A fishing lure as defined in claim 1 wherein said fishing lure attachment is a fish hook.

3. A fishing lure as defined in claim 1 wherein said fishing lure attachment is a weedguard.

4. A fishing lure as defined in claim 1, further comprising:
   a second one of said fishing lure attachments positioned in two of said apertures with a resultant spring bias created between said second one of said fishing lure attachments and body; and
   said relative spring bias holds said fishing lure attachment in a predetermined position on said body.

5. A fishing lure as defined in claim 4 wherein said fishing lure attachment and said second fishing lure attachment share a common one of said apertures.

6. A fishing lure as defined in claim 4 wherein said second fishing lure attachment is a spring wire weedguard.

7. A fishing lure, comprising;
   a body;
   a fishing hook;
   means for holding said fish hook comprising first and second apertures in said body dimensioned to permit the passage therethrough of a portion of said fish hook and positioned relative to each other for creating a spring bias between said body and said fish hook when said portion of said fish hook is rotated about the longitudinal axis of the shank of said fish hook with the axis of rotation passing through said first and second apertures; and
   a groove adjacent to one of said apertures for locking said fish hook in a predetermined position relative to said body.

8. A fishing lure as defined in claim 7, comprising:
   a weedguard; and
   means for holding said weedguard comprising said first aperture and a third aperture in said body dimensioned to permit the passage therethrough of said weedguard, said third aperture positioned relative to said first aperture for creating a spring bias between said body and said weedguard when said weedguard is positioned in said first and said third apertures for forcing said weedguard to assume a predetermined position relative to said body.

9. A spoon type artificial lure, comprising:
   a body including concave and convex surfaces on opposite sides; and
   a plurality of apertures in said body for receiving and holding by spring tension an artificial fishing lure component positioned in at least two of said apertures, said body and said component dimensioned such that said spring tension varies from zero to a maximum securing force as said component is rotated about the longitudinal axis of the segment within and between said two apertures.

10. A lure as defined in claim 9 wherein said artificial fishing lure components comprises a fish hook dimensioned to simultaneously occupy two of said apertures and produce said spring tension in response to force exerted between the edges of said apertures and said hook created by the relative position of said two apertures and the size and shape of said hook.

11. A lure as defined in claim 10, comprising:
    a grooved area on said convex surface for receiving a curved area of said hook.

12. A lure as defined in claim 10, comprising:
    means for adjusting said hook when fishing for different fish under different fishing conditions, including a plurality of hooks of different sizes for mutually exclusive attachment to said body via said apertures.

13. A lure as defined in claim 10 wherein said hook includes an eye larger in diameter than one of said apertures and laying in the same plane as said hook's curve.

14. A lure as defined in claim 10 wherein the eye portion of said hook is bent up 90 degrees to receive a line connector means for attaching a fishing line thereto.

15. A lure as defined in claim 10 wherein said artificial lure attachments further comprise a weedguard dimensioned to pass through two of said apertures and produce a weedguard holding spring tension when simultaneously positioned in said apertures.

16. A lure as defined in claim 15 wherein said apertures comprise three apertures, one of which simultaneously receives said hook and said weedguard.

17. A lure as defined in claim 15 wherein one of said apertures is offset from said apertures used to secure said hook to said spoon's body.

18. A lure as defined in claim 17 wherein said apertures comprise four apertures, two dedicated for use by said hook and two dedicated for use by said weedguard.

19. A lure as defined in claim 17 wherein said offset aperture is on the right side of said spoon's body and the tip of said weedguard is formed into a right hand bend for engaging and holding the point of said hook.

20. A lure as defined in claim 17 wherein said offset aperture is on the left side of said spoon's body and the tip of said weedguard is formed into a left hand bend for engaging and holding the points of said hook.

21. A lure as defined in claim 9 wherein one of said apertures is a front aperture dimensioned to allow a hook's point and shank to pass therethrough, and the front section of said body is bent 90 degrees to its longitudinal plane.

22. A lure as defined in claim 21 wherein said front aperture is dimensioned to comprise means for allowing the eye of a hook to partially fit into said aperture and force said hook's eye out of said aperture and create a spring bias when said hook is rotated about the longitudinal axis of its shank.

23. A lure as defined in claim 22 wherein said 90 degree bent up area of said body is dimensioned to provide a spring resilience between said hook eye and one of said apertures through which the curve of the hook has been passed.

24. A lure as defined in claim 23 wherein said spring resilience causes said hook's shank to become arched and thereby secures said hook in said body.

25. A lure as defined in claim 9 wherein said artificial fishing lure comprises a weedguard dimensioned to pass through two of said apertures and produce said spring tension as a function of the relative position of said two apertures and the configuration of said weedguard.

26. A lure as defined in claim 25, comprising:
 a plurality of weedguards of different diameters and resiliencies for mutually exclusive attachment to said body via said apertures.

27. A method for assembling a fishing lure, including the steps of:
 passing the point and curved portion of a hook through a first aperture in a lure body;
 passing the hook point and curved portion of the hook through a second aperture in the lure body spaced apart from said first aperture so that the longitudinal axis of the shank of the hook passes through said first and second apertures; and
 creating a relative spring tension between the lure body and hook by rotating the hook about said longitudinal axis so that it exerts a force against the edges of the apertures.

28. A method of assembling a fishing lure as defined in claim 27, including the further steps of:
 inserting a weedguard through said first aperture; and
 inserting an end of said weedguard in a third aperture dimensioned and positioned from said first aperture to result in a spring tension between the section of said weedguard between said first and second apertures and said lure body.

29. A method of assembling a fishing lure as defined in claim 27, including the further steps of:
 inserting a weedguard through a third aperture;
 inserting a bent end of said weedguard in a fourth aperture to thereby create a spring tension between said lure body and said weedguard for holding said weedguard in position.

30. An artificial lure, comprising:
 a body including concave and convex surfaces on opposite sides;
 a plurality of apertures in said body for receiving and holding by spring tension artificial fishing lure components positioned in at least two of said apertures and one other of said apertures is offset from said apertures used to secure said hook to said body;
 a fish hook dimensioned to simultaneously occupy two of said apertures and produce said spring tension in response to force exerted between the edges of said apertures and said hook created by the relative position of said two apertures and the size and shape of said hook;
 a weedguard dimensioned to pass through two of said apertures and produce said spring tension when simultaneously positioned in said apertures;
 said offset aperture is on the left side of said spoon's body; and
 the tip of said weedguard is formed into a left hand bend for engaging and holding the points of said hook.

31. An artificial lure, comprising:
 a body including concave and convex surfaces on opposite sides;
 a plurality of apertures in said body for receiving and holding by spring tension artificial fishing lure components positioned in at least two of said apertures and one other of said apertures is offset from said apertures used to secure said hook to said body;
 a fish hook dimensioned to simultaneously occupy two of said apertures and produce said spring tension in response to force exerted between the edges of said apertures and said hook created by the relative position of said two apertures and the size and shape of said hook;
 a weedguard dimensioned to pass through two of said apertures and produce said spring tension when simultaneously positioned in said apertures;
 said offset aperture is on the right side of said spoon's body; and
 the tip of said weedguard is formed into a right hand bend for engaging and holding the point of said hook.

32. A fishing lure, comprising:
 a body;
 a plurality of apertures in said body dimensioned to permit the passage therethrough of fishing lure attachments and positioned to result in a first relative spring bias between said body and a first one of said fishing lure attachments which passes through two of said apertures when said attachment is rotated about an axis passing through said two apertures;
 said first relative spring bias holds said first fishing lure attachment in a predetermined position on said body;
 a second one of said fishing lure attachments positioned in two of said apertures with a second relative spring bias created between said second one of said fishing lure attachments and said body;
 said second relative spring bias holds said second fishing lure attachment in a predetermined position on said body; and
 said first fishing lure attachment and said second fishing lure attachment share a common one of said apertures.

33. A fishing lure, comprising:
 a body;
 a fishing hook;
 means for holding said fish hook comprising first and second apertures in said body dimensioned to permit the passage therethrough of a portion of said fish hook and positioned relative to each other for creating a spring bias between said body and said fish hook when said portion of said fish hook is rotated about an axis passing through said first and second apertures;
 a groove adjacent to one of said apertures for locking said fish hook in a predetermined position relative to said body;
 a weedguard; and
 means for holding said weedguard comprising said first aperture and a third aperture in said body dimensioned to permit the passage therethrough of said weedguard, said third aperture positioned relative to said first aperture for creating a spring bias between said body and said weedguard when said weedguard is positioned in said first and said third apertures for forcing said weedguard to assume a predetermined position relative to said body.

34. A method for assembling a fishing lure, including the steps of:
 passing the point and curved portion of a hook through a first aperture in a lure body;

passing the hook point and curved portion of the hook through a second aperture in the lure body spaced apart from said first aperture so that the longitudinal axis of the shank of the hook passes through said first and second apertures;

creating a relative spring tension between the lure body and hook shank by rotating the hook about said longitudinal axis so that it exerts a force against the edges of the apertures;

inserting a weedguard through said first aperture; and inserting an end of said weedguard in a third aperture dimensioned and positioned from said first aperture to result in a spring tension between the section of said weedguard between said first and second apertures and said lure body.

35. A spoon type fishing lure, comprising:

a body including concave and convex surfaces on opposite sides;

a plurality of apertures in said body for receiving and holding by spring tension an artificial fishing lure component positioned in at least two of said apertures, said body and said component dimensioned such that said spring tension varies from zero to a maximum securing force as said component is rotated about its longitudinal axis within said two apertures;

a fish hook dimensioned to simultaneously occupy two of said apertures and produce said spring tension in response to force exerted between the edges of said apertures and said hook created by the relative position of said two apertures and the size and shape of said hook;

a weedguard dimensioned to pass through two of said apertures and produce a weedguard holding spring tension when simultaneously positioned in said apertures; and said apertures comprise three apertures, one of which simultaneously receives said hook and said weedguard.

* * * * *

UNITED STATES PATENT AND TRADEMARK OFFICE
CERTIFICATE OF CORRECTION

PATENT NO.   :   5,070,640
DATED        :   December 10, 1991
INVENTOR(S)  :   Welbourne D. McGahee It is certified that error appears in the above-identified patent and that said Letters Patent is hereby corrected as shown below:

Column 4 - Line 18:   After "common with the hook" please insert "and an alternate weedguard 15A having different spring properties".

Column 4 - Line 23:   Please delete "and an alternate weedguard 15A having different spring properties".

Signed and Sealed this

Nineteenth Day of May, 1992

Attest:

DOUGLAS B. COMER

*Attesting Officer*    *Acting Commissioner of Patents and Trademarks*